United States Patent [19]

Brearley et al.

[11] Patent Number: 4,530,059
[45] Date of Patent: Jul. 16, 1985

[54] VEHICLE ANTI-LOCK BREAKING CONTROL

[75] Inventors: Malcolm Brearley, Solihull; David C. Hurst, Knowle Solihull, both of England

[73] Assignee: Lucas Industries public limited company, Birmingham, England

[21] Appl. No.: 489,149

[22] Filed: Apr. 27, 1983

[30] Foreign Application Priority Data

Apr. 30, 1982 [GB] United Kingdom ............... 8212601

[51] Int. Cl.³ ............................................. B60T 8/08
[52] U.S. Cl. ................................. 364/426; 303/93; 303/97; 303/99
[58] Field of Search ................... 364/426; 303/93, 97, 303/99

[56] References Cited

U.S. PATENT DOCUMENTS 3,889,128 6/1975 Luhdorff .............................. 303/97
4,193,642 3/1980 Miller ................................... 303/97

Primary Examiner—William M. Shoop
Assistant Examiner—Saul M. Bergmann
Attorney, Agent, or Firm—Holman & Stern

[57] ABSTRACT

A vehicle anti-lock brake control system includes wheel speed sensors which input speed signals to a microprocessor via an interface circuit. The microprocessor is programmed to calculate the deceleration of each wheel, compare this with a threshold and output a signal to a brake release device (A,B,C) for as long as the deceleration exceeds the threshold. The threshold level is calculated by the microprocessor as a function of the time elapsed since the threshold deceleration is exceeded. Initially the threshold is relatively low, but rises with time elapsed. After a predetermined time interval the threshold falls to a new relatively low level which depends on the slip of the wheel. If the slip of the wheel remains higher than a set level following re-application of the brake, a low "fast re-trigger" threshold level is established so as to release the brakes again rapidly if excessive deceleration is again detected.

13 Claims, 12 Drawing Figures

VEHICLE ANTI-LOCK BREAKING CONTROL

This invention relates to a vehicle anti-lock brake control system of the generally known kind in which the deceleration of a wheel is measured and the brake on that wheel is released if the deceleration exceeds a set threshold.

With such systems there have been many previous attempts to solve the problem of ensuring that the brakes are re-applied as soon as possible after they are released so as to ensure maximum braking efficiency irrespective of the nature of the surface on which the vehicle is running, the condition of the vehicle tires, the braking effort applied by the driver and other variables. The various approaches to this problem have included setting a fixed delay from the instant when the excessive deceleration is detected and re-engaging the brakes at the end of this delay, sometimes with the refinement that the brakes are overridingly re-applied when a wheel re-acceleration is detected. Although simple, this approach cannot cope with the wide variety of conditions which can exist. It has also been proposed to set a variable delay in accordance with the rate of change of deceleration at the time of detection of the excess deceleration, but, once again this method is not sufficiently reliable in the face of road noise to ensure good efficiency in a wide variety of conditions.

To ensure early detection of the incipient skid condition it is desirable to set the deceleration threshold at a low level, but this increased sensitivity of the system exacerbates the problem of brake re-application timing. One proposal to overcome this problem is described in U.S. Pat. No. 4,223,957 in which a wheel speed signal is supplied to a first deceleration sensing switch setting a low deceleration threshold for initial brake release and also supplied to a second deceleration sensing switch by a charge storage capacitor. Detection of an incipient skid by the first switch, sets the second switch which is reset following the discharge from the charge storage capacitor of charge it accumulates dependent on the dip in wheel speed. Although this arrangement is an improvement on many of the earilier systems, it still lacks the ability to cope with widely varying conditions.

It is an object of the present invention to provide a vehicle anti-lock brake control system in which brake application timing is effected in a manner which permits high braking efficiency in a wide variety of conditions.

Broadly, a vehicle anti-lock brake control system comprises wheel speed sensing means for producing an electrical wheel speed signal dependent on the speed of a wheel, means for operating on said wheel speed signal to generate a rate of change signal dependent on the rate of change of wheel speed, means for comparing said rate of change signal with a threshold signal and for providing a brake release output signal for as long as said rate of change signal represents a wheel deceleration in excess of a threshold represented by said threshold signal, and threshold signal generating means controlled by said comparing means and generating said threshold signal at a level which varies as a function of time elapsed following a preceding change in the output of said comparing means.

More particularly a vehicle anti-lock brake control system in accordance with one aspect of the invention comprises a wheel speed sensing means for producing a signal dependent on wheel speed, means for operating on said wheel speed signal to generate a signal dependent on the rate of change of wheel speed, means for comparing said rate of change signal with a threshold signal and providing a brake release output signal for as long as said rate of change signal represents a wheel deceleration in excess of a threshold represented by said threshold signal, and means for generating said threshold signal whereby the threshold signal is initially at a level representing a relatively low wheel deceleration and rises as time elapses following initiation of said brake release output.

Preferably, where the control system is realised in the form of a digital circuit including a microprocessor, the threshold signal is changed stepwise with time.

The initial threshold signal is preferably set by selecting the smaller of two threshold signals one of which represents a fixed deceleration level and the other of which represents the difference between a higher fixed deceleration level and a term proportional to the degree of wheel slip.

Preferably the threshold signal generation means provides an arrangement for decreasing the threshold to a low level after a predetermined time interval, such level being dependent on the degree of wheel slip. Such low level may be a negative level i.e. it may represent a positive acceleration of the wheel.

In accordance with a further aspect of the invention there is provided a vehicle anti-lock brake control system comprising wheel speed sensing means for generating a signal dependent on wheel speed, means for operating on said wheel speed signal to generate a signal dependent on the rate of change of wheel speed, means for comparing said rate of change signal with a threshold signal and providing a brake release output signal for as long as said rate of change signal represents a wheel deceleration in excess of a threshold represented by said theshold signal, and means for generating said threshold signal such that if the brake release output signal persists for more than a predetermined time period, the threshold signal is changed from a level representing a relatively high wheel deceleration to a new level representing a relatively low wheel deceleration.

This relatively low wheel deceleration may be a negative deceleration, i.e. a wheel acceleration.

The threshold signal generating means is preferably arranged to make said new level variable with the slip of the wheel in question (i.e. the difference between the speed of that wheel and expected speed of the wheel at the prevailing vehicle speed).

In accordance with yet another aspect of the invention there is provided a vehicle anti-lock brake control system comprising wheel speed sensing means for generating a signal dependent on wheel speed, means for operating on said wheel speed signal to generate a signal dependent on the rate of change of wheel speed, means for comparing said rate of change signal with a threshold signal and providing a brake release output signal for as long as said rate of change signal represents a wheel deceleration in excess of a threshold represented by said threshold signal and means for generating said threshold signal such that if wheel slip (i.e. the difference between the wheel speed and the vehicle speed) fails to fall below a predetermined level within a predetermined time interval commencing when the brake release signal is terminated as a result of the deceleration falling below the threshold, a relatively low re-trigger threshold is established.

Preferably, the re-trigger threshold is dependent on the slip, i.e. the re-trigger threshold represents a deceleration threshold which falls as slip increases.

Preferably also the re-trigger threshold is dependent on the time elapsed since brake release, the re-trigger threshold representing a deceleration threshold which falls with time.

The re-trigger threshold will also ne reduced after a brake release period if an expected wheel acceleration level is not reached.

An example of the invention is shown in the accompanying drawings in which.

Figure 1:
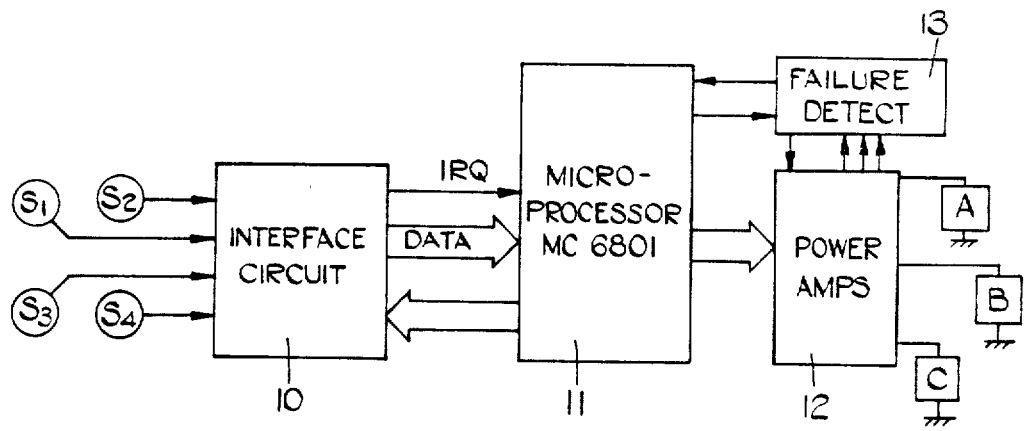
FIG. 1 is a block diagram showing an example of a brake control system featuring the invention.
Figure 2:
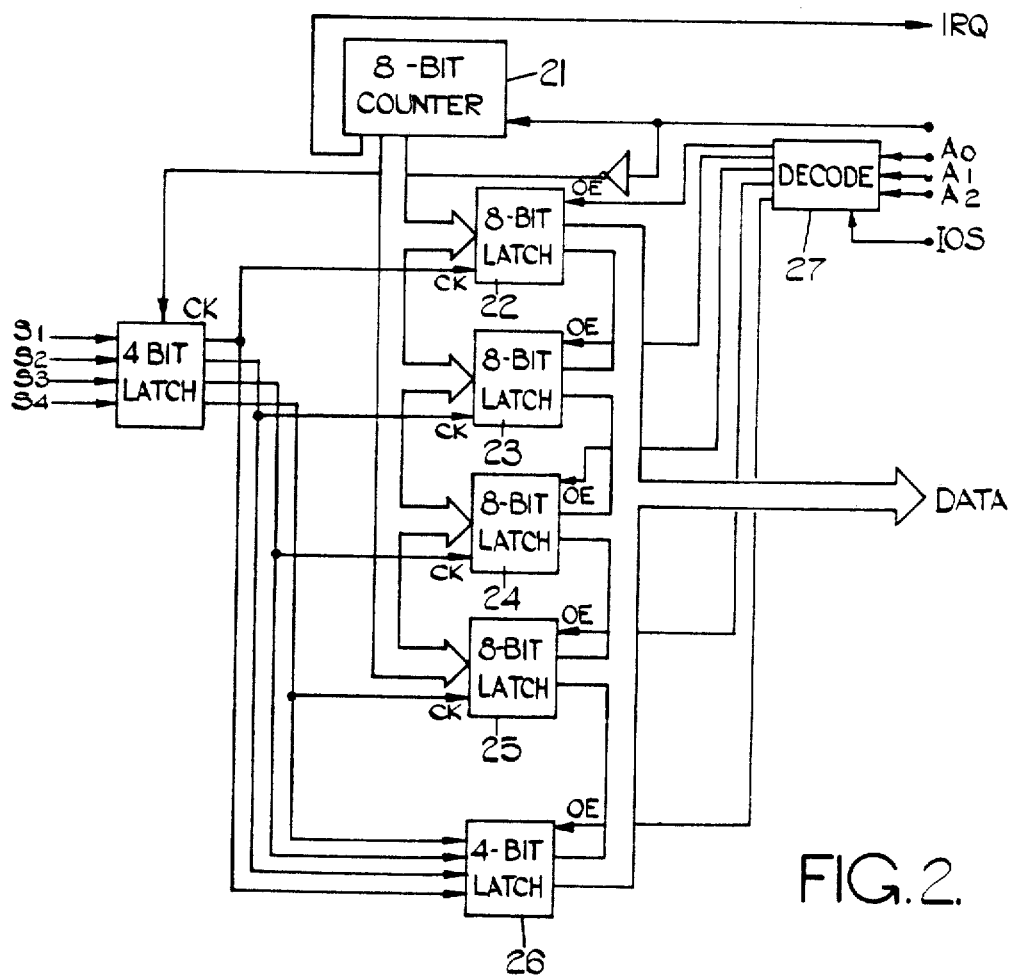
FIG. 2 is a block diagram of an interface circuit included in FIG. 1.

Referring now to FIG. 1 the system includes four wheel speed sensing devices $S_1$, $S_2$, $S_3$ and $S_4$ which are of the well known kind which emit a pulse train at a frequency proportional to wheel speed. These sensing devices are connected to an interface circuit 10 via a microprocessor circuit 11 which, in this example, is a Motorola. Microcomputer Type Mc6801. The interface circuit 10, as illustrated in FIG. 2, includes an 8-bit counter 21 which counts clock pulses from the microprocessor and a latch 22, 23, 24, 25 for each device $S_1$ to $S_4$ connected to store the count in counter 21 each time a pulse arrives from the associated device $S_1$ to $S_4$. The carry-out pulse from the counter (which occurs every $t_f$ uS) is applied to the IRQ input of the microprocessor circuit. The interface circuit also includes a latch 26 which indicates whether there has actually been a pulse from any device $S_1$ to $S_4$ since the previous carry-out pulse. The outputs from the latches 22, 23, 24 and 25 are controlled by the processor 11, via a decoder 27 which receives inputs from $A_0$ $A_1$ and $A_2$ outputs of the processor as well as from an IOS output thereof.

The output of the circuit 11 is applied via an array 12 of power amplifiers to three brake-release solenoids A, B and C which control the release of the brakes at the front left, front right and both rear sides of the vehicle respectively. A failure detection circuit 13 is connected to the amplifier array 12 and to the circuit 11, but as its function forms no part of the present invention further discussion of this circuit 13 is omitted herefrom.

Figure 3:
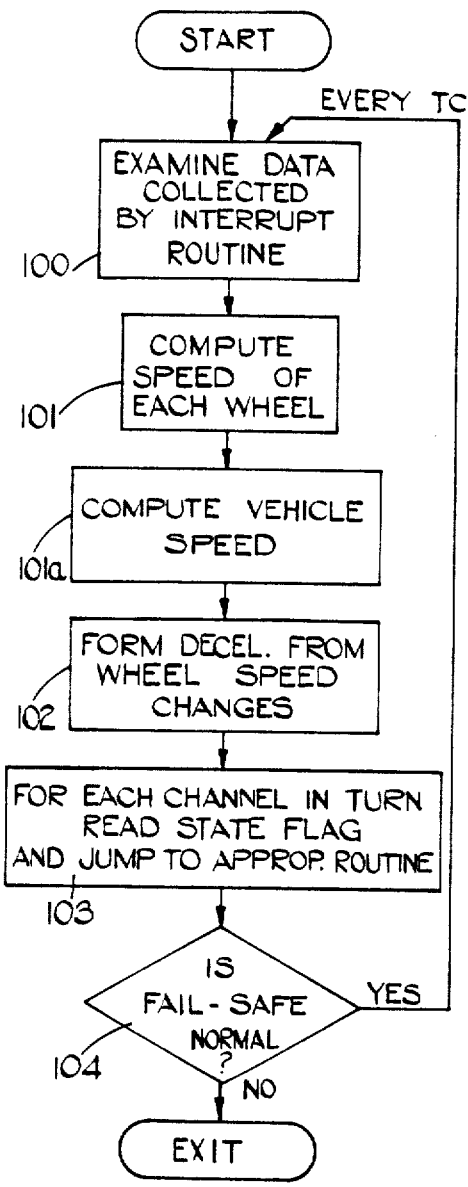
FIG. 3 is a flow chart showing the overall structure of a main routine of a programme stored in a microprocessor included in FIG. 1.

The microprocessor programme includes a main routine which is shown in outline in FIG. 3 and consists simply of an opening step (100) of examining the data collected during the immediately preceding interrupt routine, computing (101) the speed of each wheel in turn and storing the speed values derived, and (101a), computing a vehicle speed reference as a function of the wheel speeds, computing (102) the deceleration of each wheel by subtracting the new speed from the previous speed, and then, for each channel, reading to the state flag for that channel and jumping to an appropriate one of the sub-routines shown in FIGS. 5a, 5b, 5c and 5d. At the end of these sub-routines the main routine checks (104) whether the data relating to the failsafe circuit is normal. If so, the main routine starts again after a total period of $T_{cyc}$.mS. If not the control closes down and provides a warning via the failure detection circuit 13.

Figure 4:
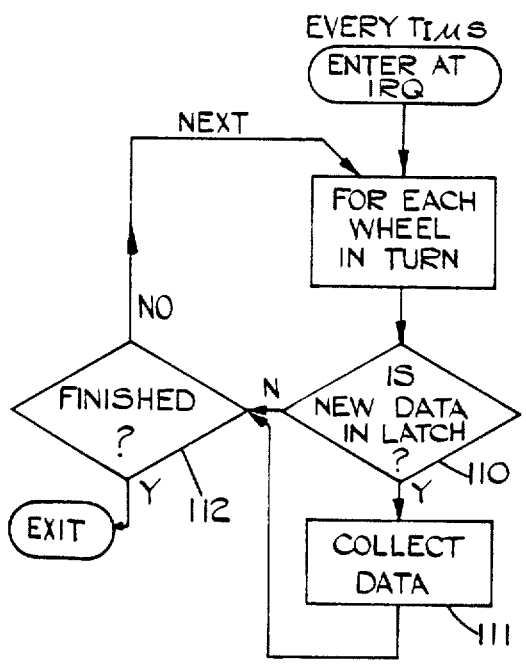
FIG. 4 is a flow chart showing an interrupt routine of the programme.

The interrupt routine is commenced every $t_f$ uS and is shown in FIG. 4. As shown this routine ascertains (110) for each wheel in turn whether there is any new data in the associated latch 22-25 since the last interrupt routine by checking the appropriate bit output of latch 26. If so the data from the appropriate latch 22-25 is stored (111). If not the interrupt routine either returns to step 110 or exits back to the main routine depending on whether all four latches 22-25 have been read or not (112).

Figure 5A:
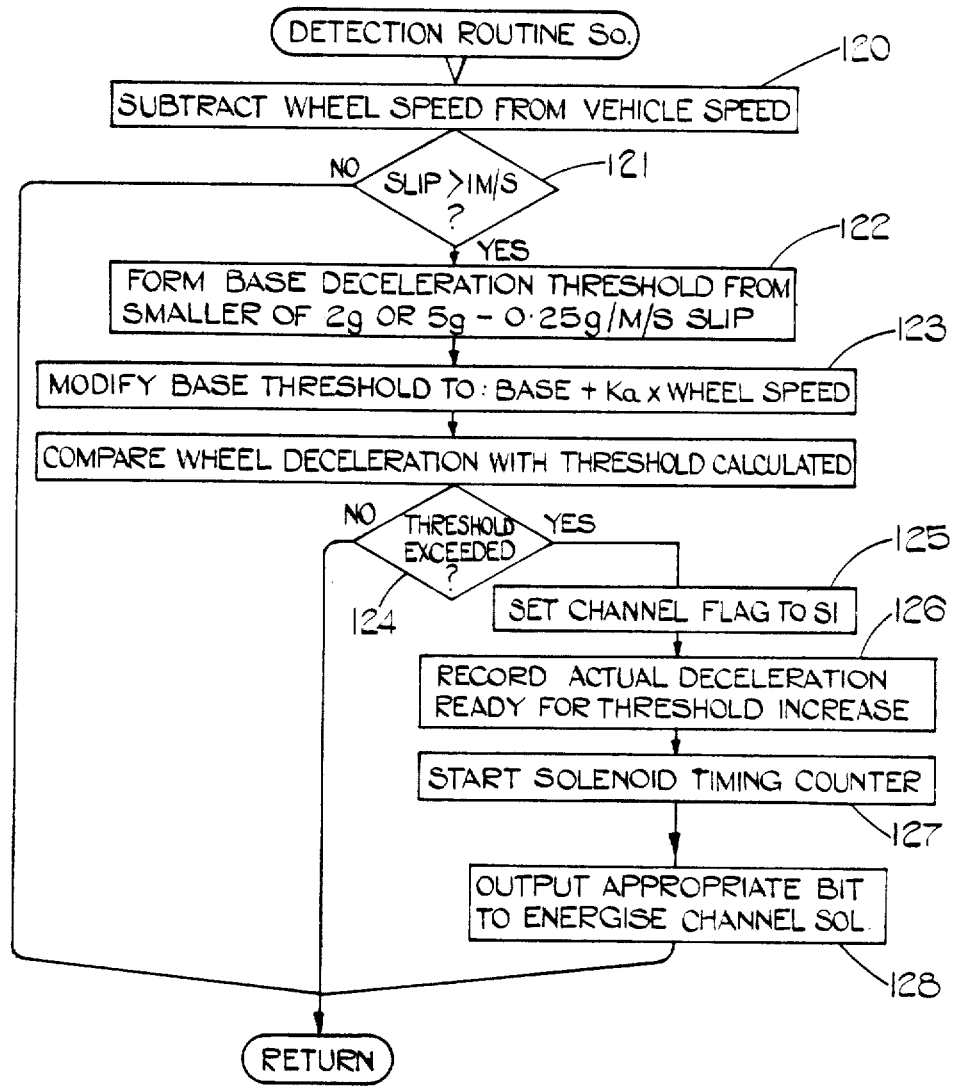
FIGS. 5a to 5d are flow charts showing more detail of parts of the main routine.

Turning now to FIG. 5a a detection sub-routine $S_o$ is shown therein. In this sub-routine the speed of the wheel in question is subtracted (120) from the vehicle speed reference generated from the four wheel speeds and a decision (121) is made as to whether the slip is greater than 1 m/s. If not the programme returns to the main routine, (since any slip which exists is within the tolerance which can be allowed). If so a base deceleration threshold signal is calculated (122) by selecting typically the smaller of 2 g or 5 g–0.25 g/m/s of slip. and threshold signal is then generated (123) by adding to this base threshold signal a term proportional to wheel speed. The actual wheel deceleration signal derived following the immediately previous interrupt routine is then compared (124) with the calculated threshold and, if the actual deceleration does not exceed the threshold deceleration, the programme returns to the main routine. If the threshold deceleration is exceeded, the programme sets (125) the flag for that channel to $S_1$ (so that the release pulse sub-routine $S_1$ is entered for this channel in the next main routine cycle $T_{cyc}$ mS later). The value of the actual deceleration signal is recorded (126), a solenoid timing counter (which counts the main routine cycles for the channel) is started (127) and an appropriate bit is output (128) to energise the solenoid A, B or C. Thereafter the programme returns to the main routine.

The release pulse sub-routine $S_1$ (FIG. 5b) starts with a test (130) of the solenoid timing counter content. If this is not greater than unity the stored deceleration threshold signal is increased (131) by 0.5 g and, if the count is greater than unity 2 g is added (132) to the deceleration threshold signal. The solenoid timing counter is incremented (133) and the latest actual deceleration signal is compared (134) with the new deceleration threshold signal. If the new threshold is exceeded a test (135) is made to ascertain if the solenoid timing counter content is more than 3. If so the channel flag is set (136) to $S_3$ (so that on the next cycle, the main dump and sub-routine $S_3$ for the channel is entered). The programme then returns to the main routine. If the count is not greater than 3 the programme returns directly to the main routine. If the new threshold is not exceeded, the bit output which energised the solenoid is cleared (137), the channel flag is set to $S_2$ (so that the monitor state sub-routine $S_2$ is entered for that channel in the next cycle), the solenoid timing counter is cleared (139) and an $S_2$ timer is started (140).

When the monitor state sub-routine $S_2$ is entered (FIG. 5c) a test (150) is made to determine whether the $S_2$ timer count is equal to one. If so, the programme returns directly to the main routine. If not, a test (151) is made to ascertain whether the slip (i.e. vehicle speed-wheel speed) is less than 2.2 m/s. If so the channel flag is set (152) to $S_o$ (so that the detection sub-routine $S_o$ is entered on the next cycle), the $S_2$ timer is cleared (153) and the programme returns to the main routine. If the slip is not less than 2.2 m/s then a re-trigger threshold is established (154) which is typically the smaller of 8 g or 12 g-4 g/m/s of slip but may optionally include a term which gives a reduced threshold if an expected recovery acceleration is not achieved. The actual deceleration is then checked against this threshold and if the threshold is exceeded the channel flag is set (156) to $S_3$ (so that the main dump sub-routine is entered on the next main routine cycle), an output is provided (157) to the appropriate solenoid, the $S_2$ timer is cleared (158), and the solenoid timing counter is started again (159). If the threshold is not exceeded, a fast retrigger threshold signal (160) as 8 g-(1.4 g/m/s slip+0.5 g×$S_2$ timer content). The deceleration is then tested (161) against this fast retrigger threshold and if found not to exceed the threshold the $S_2$ timer is incremented (162) and the programme returns to the main routine. If the fast retrigger threshold is exceeded the channel flag is set (163) to $S_1$ (so that the release pulse sub-routine $S_1$ is entered on the next cycle), the appropriate bit output energises (164) the channel solenoid, the $S_2$ timer is cleared, the solenoid timing counter is started (164) and the programme returns to the main routine.

The main dump sub-routine $S_3$ (FIG. 5d) starts by incrementing the solenoid timer count (170) and a solenoid release threshold is then formed (171) as typically 8 g-1.4 g/m/s slip. The actual deceleration is compared with this threshold and if the threshold is exceeded the solenoid on signal is maintained (173) and the programme returns to the main channel. If the threshold is not exceeded the channel flag is set (174) to $S_2$ (so that the monitor state routine is entered on the next cycle), the solenoid is released by clearing (175) the output bit, the solenoid timing counter is cleared (176), the $S_2$ timer is started and the programme returns to the main routine.

Figure 6:
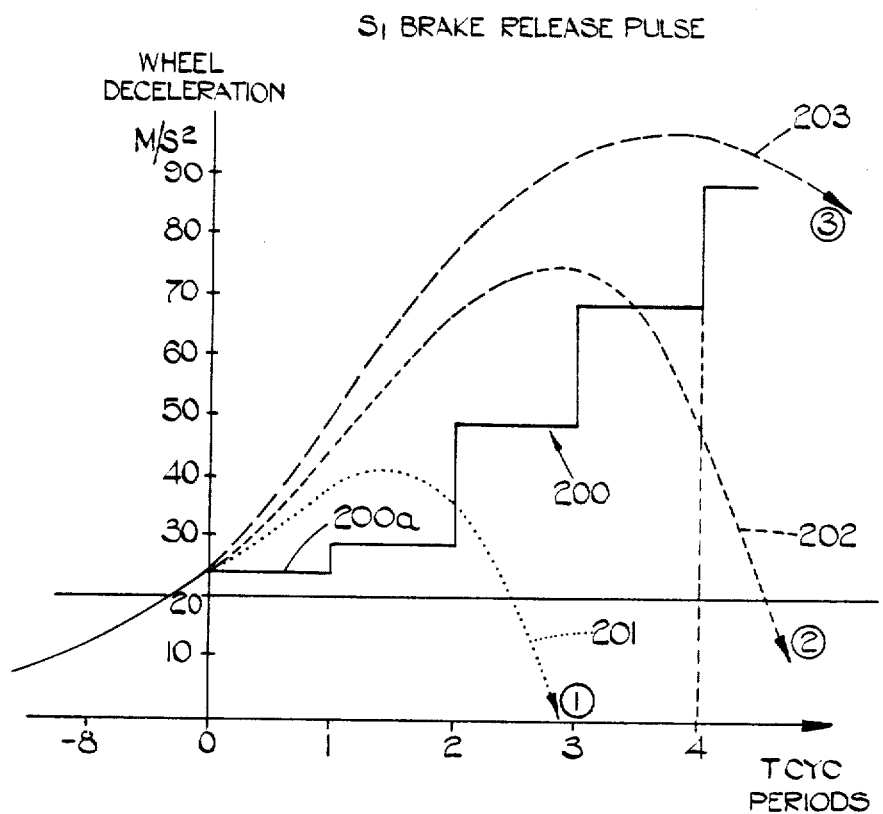
FIGS. 6 to 8 are graphs illustrating operation of the control system in various modes of operation.
Figure 7:
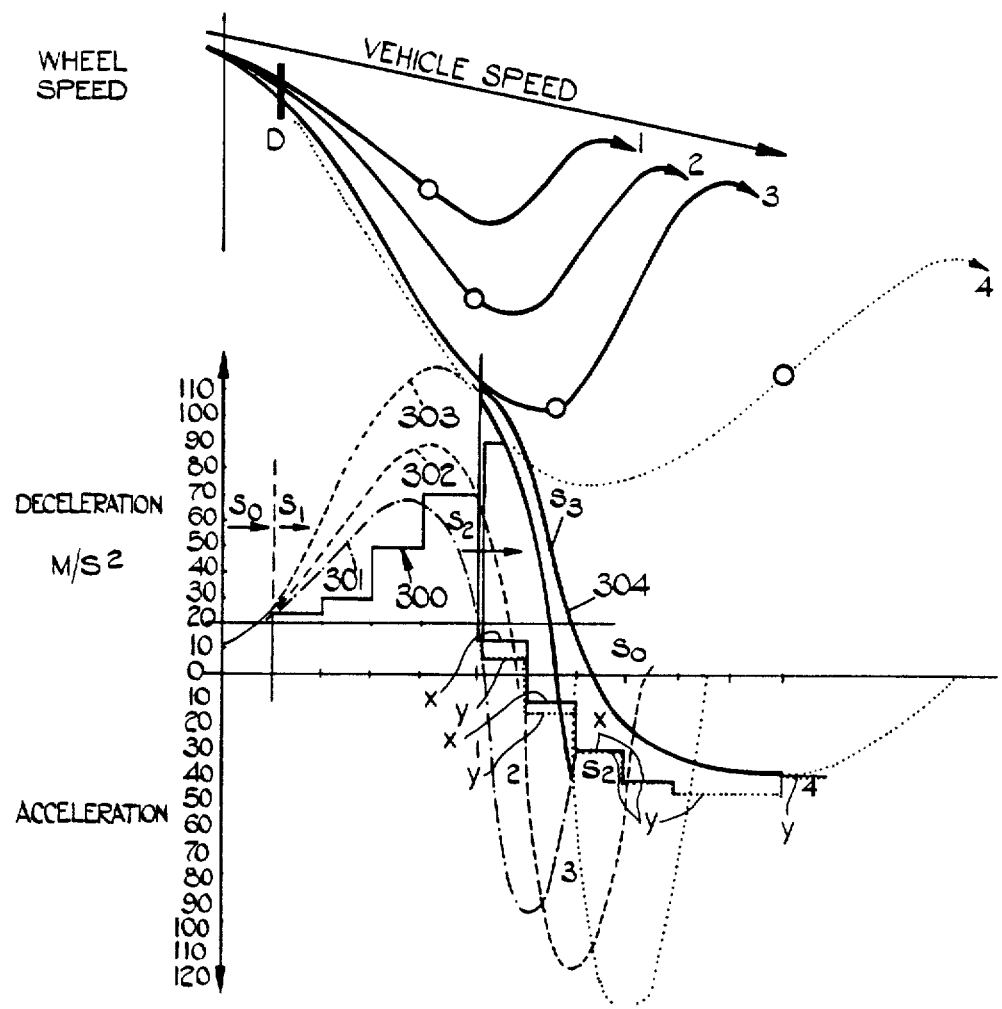
Figure 8:
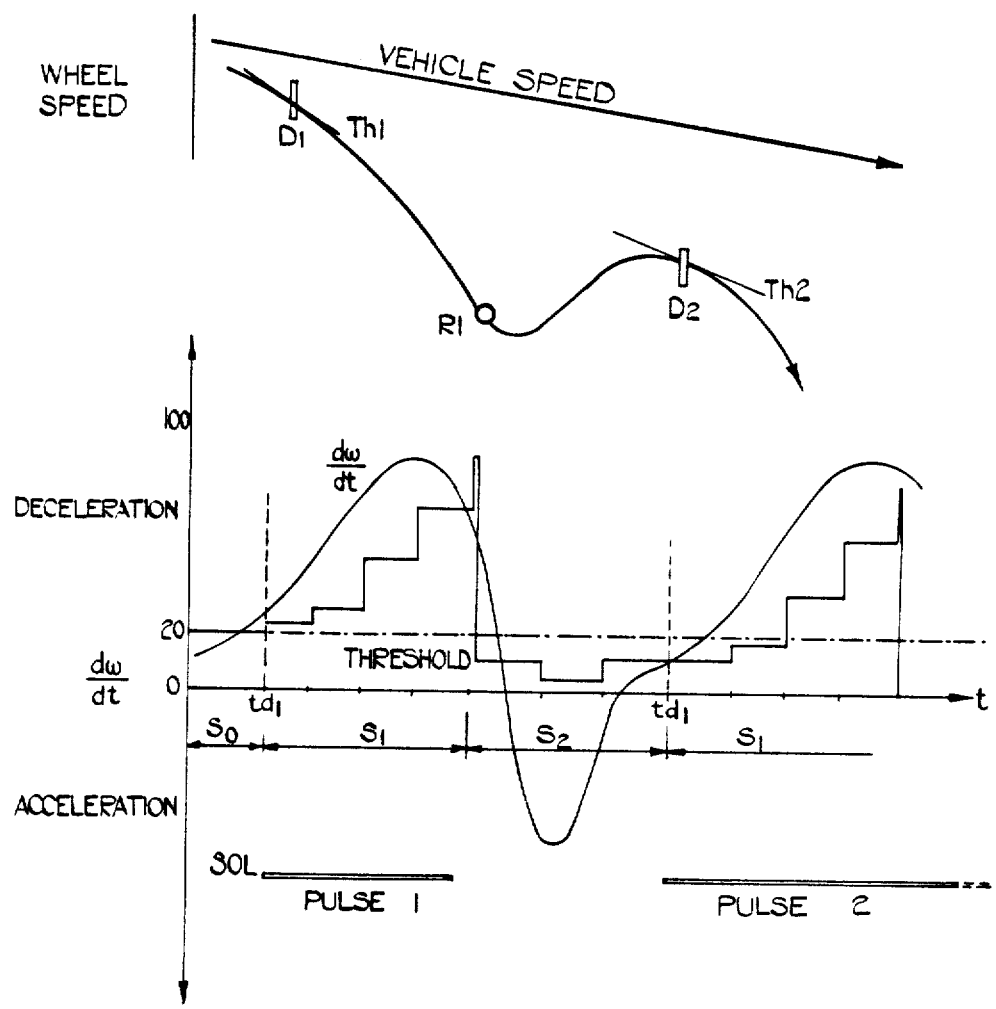

FIGS. 6 to 8 illustrate the operation of the system.

FIG. 6 shows the wheel deceleration plotted against time for skids of three different degrees of severity. A stepped line 200 shows how the threshold signal varies with time. This threshold line 200 commences at an initial level 200a determined in the detection routine $S_o$ (steps 122 and 123). After one main routine cycle ($T_{cyc}$mS) the threshold is increased by 0.5 g and after a further 8 mS it is increased by 2 g (steps 131, 132 of sub-routine $S_1$). The line 201 represents a shallow skid in which the first 2 g step increase takes the threshold above the measured wheel deceleration and therefore allows the brakes to be re-applied after 2x$T_{cyc}$. Further step increases of 2 g occur after successive $T_{cyc}$ intervals and line 202 represents a somewhat more severe skid in which the deceleration falls below the threshold after two 2 g increases have been made. The brakes are re-applied at the 4x$T_{cyc}$ point. Line 203 shows an even more severe skid in which the deceleration has failed to fall below the threshold after 4x$T_{cyc}$. This condition is the one which causes the sub-routine $S_3$ to be entered on the next cycle.

FIG. 7 contains two plots, one showing wheel speed against time and the other deceleration against time. This second plot shows the effect of sub-routines $S_1$ and $S_3$. Line 300 shows, the step-wise increases in the threshold. Curves 301, 302 and 303 show skids of increasing severity. In the case of lines 301 and 302 the deceleration falls below threshold before 4x$T_{cyc}$ has expired, so that sub-routine $S_3$ is not entered. Instead sub-routine $S_2$ is entered (its effect being shown in FIG. 8). In the case of line 303, however, sub-routine $S_3$ is entered and the threshold signal is then dependent on the degree of slip which is changing with time. The solid line step function x in FIG. 7 shows the threshold in the case of line 303 in the $S_3$ mode. Line 304 shows another even more severe skid (for example on a very poor surface). The dotted line step function y shows the $S_3$ threshold for line 304. It will be noted that the deceleration threshold in $S_3$ mode soon becomes negative (i.e. it represents a positive acceleration). Thus on very low friction surfaces brake re-application is delayed until an substantial wheel acceleration is detected.

Referring finally to FIG. 8, the effect of sub-routine $S_2$ is shown, FIG. 8 having two plots respectvely showing wheel speed and deceleration as a function of time. The initial detection deceleration threshold is set up in steps 122 and 123 of sub-routine $S_o$, and routine $S_1$ (step 134) determines re-application of the brakes. The re-trigger threshold of sub-routine $S_2$ is then introduced to determine when the next brake release is to be effected. The $S_2$ mode continues with the re-trigger threshold falling with time (because of the 0.5 g×$S_2$ timer content term) until either the slip falls below 2.2 m/s (in which case the channel reverts to the $S_o$ mode) or the $S_3$ or $S_1$ modes are entered when deceleration is compared with the re-trigger threshold (step 155) or with the fast re-trigger threshold (step 161).

The system described above provides excellent early detection of deceleration with the brake release pulse thus produced being terminated shortly (i.e. after, 1, 2, 3 or 4 $T_{cyc}$) unless the absolute deceleration level is high. In the latter case, i.e. if the threshold is still exceeded when it reaches its maximum level after 4$T_{cyc}$, the brake release pulse is maintained and the mode of operation is changed so that there must be clear evidence of wheel recovery before the brakes can be re-applied. The threshold then set depends on slip and generally requires an actual acceleration level to be achieved before brake re-application. On brake re-application a wheel recovery mode is entered in which a low level re-detection threshold is set, which may, in some extreme cases, be a low acceleration, and which reduces as the measured slip increases and also as time elapses (at constant slip). This increased sensitivity mode is maintained for a fixed time before the normal detection mode is re-entered or until the wheel attains synchronous running.

Thus the system described above overcomes all the disadvantages of the prior art mentioned and can be relied upon to operate satisfactorily in widely varying operating conditions.

Although the description given above is of an embodiment of the invention which, makes use of a microprocessor, it will be appreciated that exactly the same results could be obtained utilizing logic circuits and/or analog circuits to carry out the various threshold signal generation and comparison functions. Such circuits would necessarily be complex and would, of course, be less readily changeable to suit different vehicle type than the microprocessor embodiment described, in which changes can, if necessary, be made in the stored programme to allow the system to be matched to different vehicle types.

All threshold expressions quoted are only typical of values which are used and adjustments of the stored program may involve changes to the terms of each or all these threshold expressions to allow for differences in vehicle parameters.

Figure 5B:
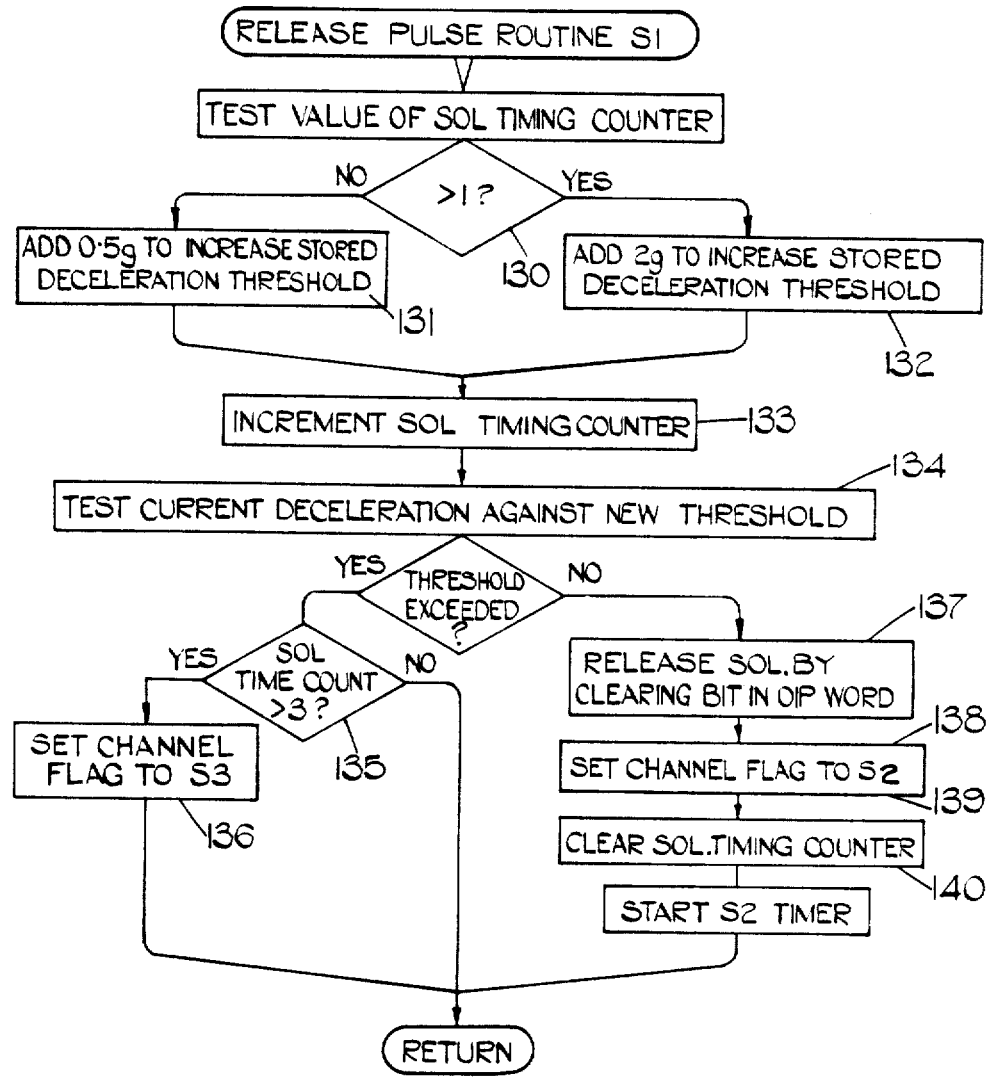
Figure 5C:
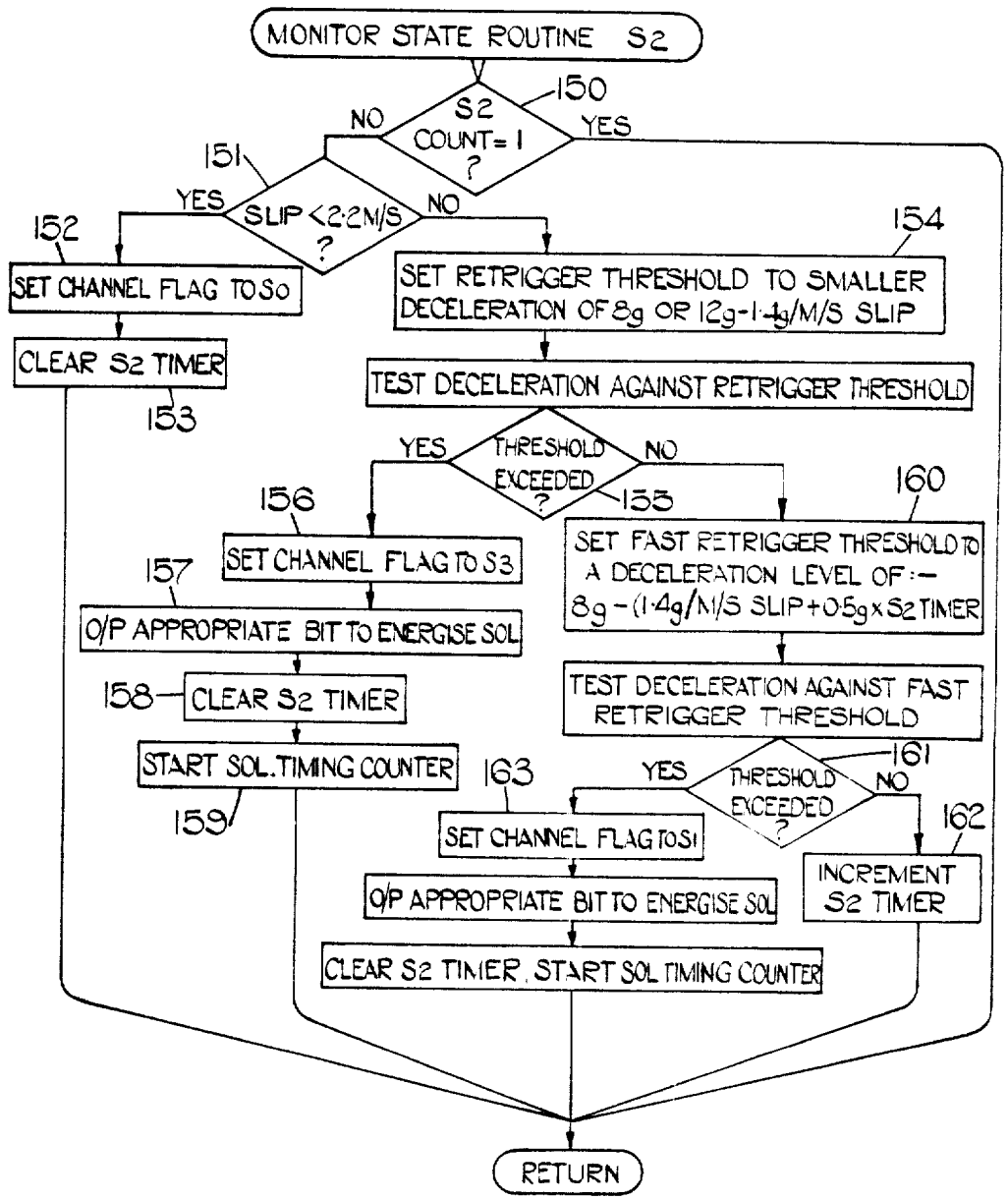
Figure 5D:
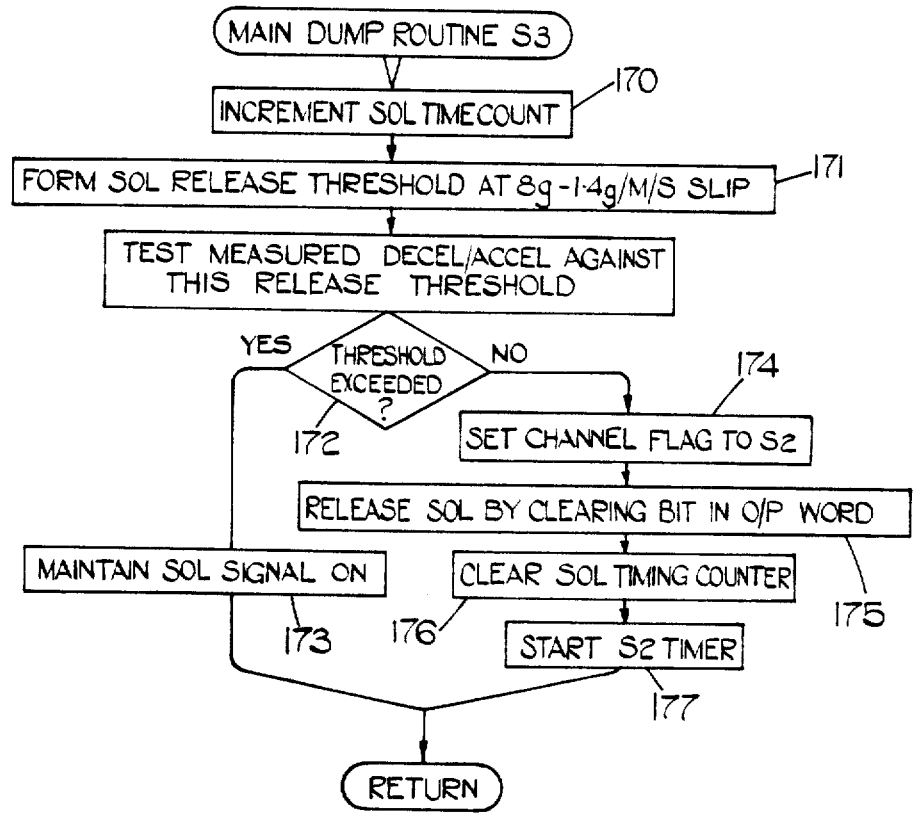
Figure 9:
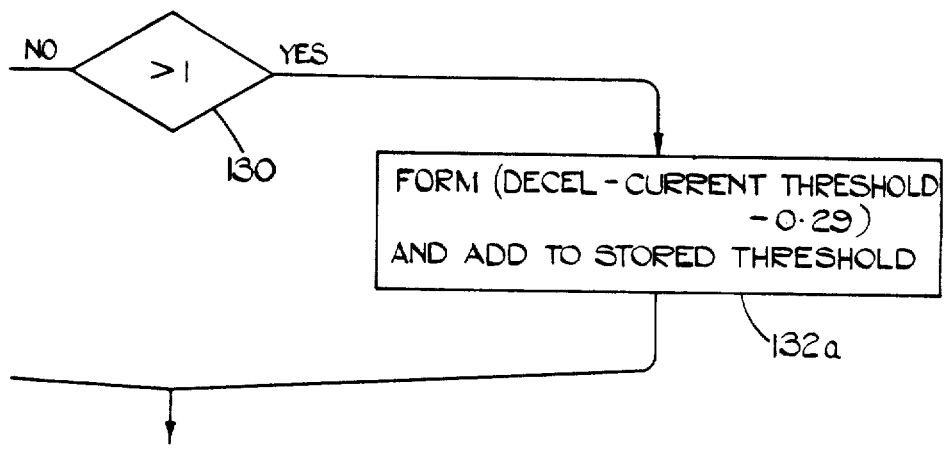
FIG. 9 shows a modification to FIG. 5b.

In the modification shown in FIG. 9, the step 132 of FIG. 5b is replaced by a step 132a. Here, instead of increasing the threshold by a fixed increment in each cycle, the new threshold is generated by adding to the existing stored threshold a term dependent on the amount by which the measured deceleration exceeds the existing threshold.

We claim:

1. A vehicle anti-lock brake control system comprising:
   wheel speed sensing means for producing a signal dependent on wheel speed;
   means responsive to said wheel speed signal for generating a signal dependent on the rate of change of wheel speed;
   means for comparing said rate of change signal with a threshold signal and providing a brake release output signal for as long as said rate of change signal represents a wheel deceleration in excess of a deceleration threshold represented by said threshold signal;
   means for generating said threshold signal such that the threshold signal is initially at a level representing a relatively low wheel deceleration and increases as time elapses following initiation of said brake release output; and
   means for initially setting the threshold signal by selecting the smaller of two signals, one of which represents a fixed deceleration level and the other of which represents the difference between a higher fixed deceleration level and a term proportional to wheel slip (i.e. the difference between the speed of the wheel and a vehicle reference speed derived from a combination of speed of the wheels of the vehicle).

2. A vehicle anti-lock brake control system as claimed in claim 1 in which the threshold signal generating means includes means responsive to an increase in said threshold signal over a predetermined time interval for reducing the threshold signal to a new low deceleration level.

3. A vehicle anti-lock brake control system as claimed in claim 2 in which said new low level is dependent on wheel slip (i.e. the difference between the speed of the wheel and a vehicle reference speed derived from a combination of speed of the vehicle wheels).

4. A vehicle anti-lock brake control system comprising:
   wheel speed sensing means for generating a signal dependent on wheel speed;
   means for generating a threshold signal representing a predetermined vehicle wheel deceleration threshold;
   means responsive to said wheel speed signal for generating a signal dependent on the rate of wheel speed;
   means for comparing said rate of change signal with said threshold signal and providing a brake release output signal for as long as said rate of change signal represents a wheel deceleration in excess of said deceleration threshold represented by said threshold signal;
   means responsive to wheel slip, defined as the difference between the wheel speed and a vehicle reference speed, failing to fall below a predetermined level within a predetermined time integral commencing when the brake release signal is terminated as a result of the deceleration falling below the deceleration threshold, for establishing a relatively low re-trigger threshold, which in some extreme cases is a low acceleration; and
   wherein said means for generating said threshold signal includes means for providing the threshold signal initially at a level representing a relatively low deceleration and then increasing as time elapses following initiation of said brake release output signal.

5. A vehicle anti-lock brake control system as claimed in claim 4 in which the re-trigger threshold is dependent on the degree of wheel slip, i.e. the re-trigger threshold represents a deceleration threshold which falls as slip increases.

6. A vehicle anti-lock brake control system as claimed in claim 5, in which the re-trigger threshold is also dependent on the time elapsed since brake release, the re-trigger threshold representing a deceleration threshold which falls with time, and may take a small acceleration value.

7. A vehicle anti-lock brake control system as claimed in claims 4, 5 or 6 wherein said control system comprises a digital circuit including a microprocessor which generates the threshold signal at discrete time intervals, the threshold signal changing stepwise with time.

8. A method of controlling a brake release device in an anti-lock vehicle braking system in accordance with the output of an electrically generated wheel speed signal representing the speed of a wheel, comprising the steps of:
   (a) operating on said wheel speed signal to generate an electrical rate of change signal dependent on the rate of change of the speed of the wheel;
   (b) comparing the rate of change signal with a threshold signal;
   (c) in response to the comparison performed in step (b), causing the brake release device to be operated to release the brake on the wheel for as long as the rate of change signal represents a wheel deceleration exceeding a threshold represented by the threshold signal;
   (d) generating the threshold signal such that the threshold signal is initially at a level representing a relatively low wheel deceleration and increases as time elapses following release of the brake; and
   initially setting the threshold signal by selecting the smaller of two signals, one of which represents a fixed deceleration level and the other of which represents the difference between a higher deceleration and a term proportional to wheel slip, wherein wheel slip is defined as the difference between the speed of the wheel and the vehicle reference speed derived from a combination of speed of the wheels of the vehicle.

9. A method as claimed in claim 8 in which said threshold signal is caused to increase from an initial low value as time elapses.

10. A method as claimed in claim 8 in which said threshold signal is caused to fall to a new low value if the wheel speed signal still exceeds the threshold signal for a first predetermined time interval following brake release.

11. A method as claimed in claim 8 in which the threshold signal is set at a relatively low re-trigger threshold level if the wheel slip (i.e. the difference between the wheel speed and the vehicle reference speed) fails to fall below a predetermined level within a second pretermined time interval commencing when brake release is terminated as a result of the deceleration falling below the previously established threshold.

12. A vehicle anti-lock brake control system comprising:
   wheel speed sensing means for generating a signal dependent on wheel speed;
   means responsive to said wheel speed signal for generating a signal dependent on the rate of change of wheel speed;
   means for comparing said rate of change signal with a threshold signal and providing a brake release output signal for as long as said rate of change signal represents a wheel deceleration in excess of a deceleration threshold represented by said threshold signal; and
   means for generating said threshold signal such that if the brake release output signal persists for more than a predetermined time period, the threshold signal is changed from a level representing a relatively high wheel deceleration to a new level representing a lower wheel deceleration or even a low acceleration in extreme cases, said new level being dependent on wheel slip (i.e. the difference between wheel speed and the vehicle reference derived from a combination of the speed of the wheels of the vehicle).

13. A vehicle anti-lock brake control system comprising:
   wheel speed sensing means for generating a wheel speed signal dependent on wheel speed;
   wheel slip generating means responsive to said wheel speed signal for generating a wheel slip signal dependent on the difference between the wheel speed signal and a signal representing vehicle speed;
   wheel deceleration signal generating means responsive to said wheel speed signal for generating a wheel deceleration signal dependent on the rate of change of the wheel speed signal;
   means for comparing the wheel deceleration signal with a threshold signal and providng a brake release signal when the wheel deceleration signal represents a wheel deceleration exceeding a threshold represented by said threshold signal;
   means responsive to termination of the brake release signal for establishing a sensitive monitor state to monitor recovery of the wheel from a slipping condition and reestablish the brake release signal in the event of a wheel recovery being interrupted; and
   means responsive to said wheel slip signal for terminating said sensitive monitor state when the wheel slip signal represents a wheel slip less than a predetermined level.

* * * * *